US012617726B2

(12) United States Patent
Matsumoto et al.

(10) Patent No.: US 12,617,726 B2
(45) Date of Patent: May 5, 2026

(54) ZIRCONIA-BASED COMPOSITE OXIDE AND METHOD FOR MANUFACTURING ZIRCONIA-BASED COMPOSITE OXIDE

(71) Applicant: DAIICHI KIGENSO KAGAKU KOGYO CO., LTD., Osaka (JP)

(72) Inventors: Kazuya Matsumoto, Osaka (JP); Hiroshi Kodama, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 1103 days.

(21) Appl. No.: 17/602,668

(22) PCT Filed: Jul. 14, 2020

(86) PCT No.: PCT/JP2020/027337
§ 371 (c)(1),
(2) Date: Oct. 8, 2021

(87) PCT Pub. No.: WO2021/020104
PCT Pub. Date: Feb. 4, 2021

(65) Prior Publication Data
US 2022/0177372 A1     Jun. 9, 2022

(30) Foreign Application Priority Data
Jul. 30, 2019    (JP) ................................. 2019-140119

(51) Int. Cl.
$C04B\ 35/48$      (2006.01)
$B01J\ 35/40$      (2024.01)
(52) U.S. Cl.
CPC ............... $C04B\ 35/48$ (2013.01); $B01J\ 35/40$ (2024.01); $C04B\ 2235/77$ (2013.01)

(58) Field of Classification Search
CPC ...... $C04B\ 35/48$; $C04B\ 2235/77$; $B01J\ 35/40$; $B01J\ 23/10$; $C01P\ 2004/51$;
(Continued)

(56) References Cited

U.S. PATENT DOCUMENTS

| | | |
|---|---|---|
| 2006/0018822 A1 | 1/2006 | Okamoto |
| 2008/0050593 A1 | 2/2008 | Okamoto |

(Continued)

FOREIGN PATENT DOCUMENTS

| | | |
|---|---|---|
| CN | 101596451 A | 12/2009 |
| CN | 105339307 A | 2/2016 |

(Continued)

OTHER PUBLICATIONS

International Search Report issued in PCT/JP2020/027337; mailed Sep. 29, 2020.

(Continued)

*Primary Examiner* — Cameron K Miller
(74) *Attorney, Agent, or Firm* — Studebaker Brackett PLLC

(57) ABSTRACT

The purpose of the present invention is to provide a zirconia-based composite oxide for making it possible to form a catalyst layer which, despite having a reduced thickness, has a sufficient quantity of catalyst to function in exhaust gas treatment on a wall of a honeycomb structure. The purpose of the present invention is also to provide a method for manufacturing said zirconia-based composite oxide. The present invention relates to a zirconia-based composite oxide characterized in that the tap bulk density thereof is 0.75 g/mL or greater, and the specific surface area thereof after heat treatment for three hours at 1000° C. is 45 $m^2$/g or greater.

14 Claims, 1 Drawing Sheet

(58) Field of Classification Search
CPC .............. C01P 2004/61; C01P 2006/11; C01P 2006/12; C01P 2006/16; C01P 2006/17
See application file for complete search history.

(56)                    References Cited

U.S. PATENT DOCUMENTS

| | | | |
|---|---|---|---|
| 2009/0258781 A1 | 10/2009 | Maruki et al. | |
| 2016/0121301 A1* | 5/2016 | Shingai ................... | C01G 25/02 |
| | | | 502/303 |
| 2016/0207027 A1* | 7/2016 | Kodama ................. | B01J 23/10 |
| 2016/0304436 A1* | 10/2016 | Schaack ................ | C07C 209/72 |
| 2020/0188885 A1 | 6/2020 | Itani et al. | |

FOREIGN PATENT DOCUMENTS

| | | |
|---|---|---|
| JP | 2006-036576 A | 2/2006 |
| JP | 2008-081392 A | 4/2008 |
| JP | 2015-189655 A | 11/2015 |
| WO | 2015/145787 A1 | 10/2015 |
| WO | 2017/072509 A1 | 5/2017 |
| WO | 2018/115436 A1 | 6/2018 |

OTHER PUBLICATIONS

An Office Action mailed by China National Intellectual Property Administration on Feb. 17, 2023, which corresponds to Chinese Patent Application No. 202080051440.3 and is related to U.S. Appl. No. 17/602,668; with English language translation.

The extended European search report issued by the European Patent Office on Jan. 5, 2023, which corresponds to European Patent Application No. 208468199-1108 and is related to U.S. Appl. No. 17/602,668.

An Office Action; "Notice of Reasons for Refusal," mailed by the Japanese Patent Office on Jan. 31, 2023, which corresponds to Japanese Patent Application No. 2021-536905 and is related to U.S. Appl. No. 17/602,668; with English language translation.

International Preliminary Report on Patentability and Written Opinion issued in PCT/JP2020/027337; mailed on Feb. 10, 2022.

An Office Action mailed by China National Intellectual Property Administration on Aug. 15, 2023, which corresponds to Chinese Patent Application No. 202080051440.3 and is related to U.S. Appl. No. 17/602,668; with English translation.

Communication pursuant to Rule 114(2) EPC mailed by the European Patent Office on Apr. 4, 2023, which corresponds to European Patent Application No. 20846819.9-1108 and is related to U.S. Appl. No. 17/602,668.

Experimental data for Preparative Examples 6 and 11 of WO 2017/072509 A1.

An Office Action; "Notice of Reasons for Refusal," mailed by the Japanese Patent Office on Sep. 1, 2022, which corresponds to Japanese Patent Application No. 2021-536905 and is related to U.S. Appl. No. 17/602,668; with English language translation.

An Office Action mailed by China National Intellectual Property Administration on Jul. 8, 2022, which corresponds to Chinese Patent Application No. 202080051440.3 and is related to U.S. Appl. No. 17/602,668; with English language translation.

* cited by examiner

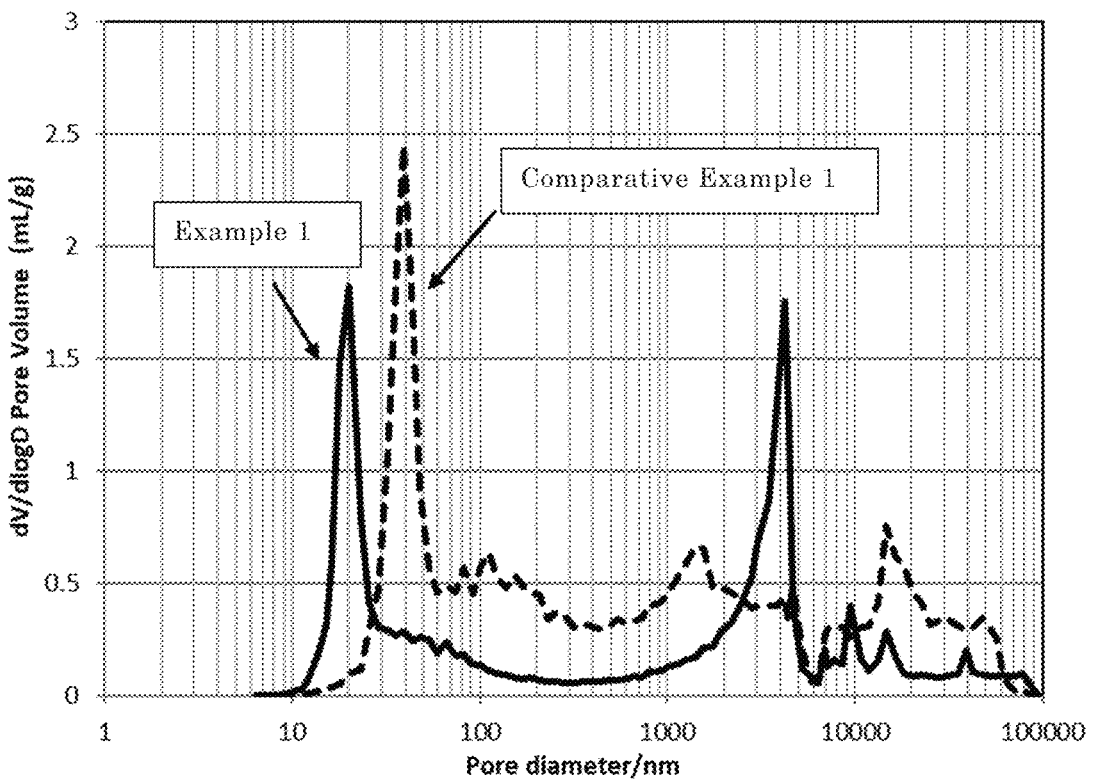

ZIRCONIA-BASED COMPOSITE OXIDE AND METHOD FOR MANUFACTURING ZIRCONIA-BASED COMPOSITE OXIDE

TECHNICAL FIELD

The present invention relates to a zirconia-based composite oxide and a method for manufacturing a zirconia-based composite oxide.

BACKGROUND ART

Exhaust gas discharged from internal combustion engines of automobiles and the like, or combustion engines such as boilers contains hazardous substances such as carbon monoxide (CO), hydrocarbon (HC), and nitrogen oxide (NOx) which cause air pollution and the like. Efficient purification of these hazardous substances is an important issue from the viewpoint of preventing environmental contamination and the like. Exhaust gas purification techniques which can purify the three hazardous substances at the same time have been actively studied.

Recent tightening of exhaust gas regulations provides advanced development of a honeycomb structure. The honeycomb structure includes a filter collecting particulate matters (for example, gasoline particulate filter (GPF) and diesel particulate filter (DPF)) and having ternary catalytic performance for purifying carbon monoxide, hydrocarbon, and nitrogen oxide. A catalyst material is used in a state where the honeycomb structure is coated with the catalyst material in a slurry state.

Patent Document 1 discloses a zirconia-based porous body having peaks in pore diameters of 8 to 20 nm and 30 to 100 nm in a pore distribution based on the BJH method and a total pore volume of 0.4 cc/g or more, and a zirconia-based porous body having a peak in a pore diameter of 20 to 110 nm in a pore distribution based on the BJH method and a total pore volume of 0.4 cc/g or more (particularly see claim 1). Patent Document 1 discloses that a specific surface area after firing at 1000° C. for 3 hours is at least 30 m²/g (particularly see claim 6).

Patent Document 2 discloses a zirconia-based porous body which has a total pore volume of at least 0.75 ml/g after heat treatment at 1000° C. for 3 hours and in which the pore volume of pores having a diameter of 10 to 100 nm after heat treatment at 1000° C. for 3 hours is at least 30% of the total pore volume (particularly see claim 1). Patent Document 2 discloses that a specific surface area after heat treatment at 1000° C. for 3 hours is at least 35 m²/g (particularly see claim 2).

Patent Document 3 discloses a zirconia-based porous body having (1) a peak in a pore diameter of 20 to 100 nm in a pore distribution based on the BJH method, a P/W ratio of 0.05 or more, wherein W represents a half width of a peak obtained in a measured pore distribution curve and P represents a height of the peak, and a total pore volume of 0.5 cm³/g or more; and (2) a peak in a pore diameter of 20 to 100 nm, the P/W ratio of 0.03 or more, a specific surface area of at least 40 m²/g, and a total pore volume of 0.3 cm³/g or more, after heat treatment at 1000° C. for 12 hours (particularly see claim 1). Patent Document 3 discloses that the zirconia-based porous body has a specific surface area of at least 20 m²/g after heat treatment at 1100° C. for 12 hours (particularly see claim 2).

PRIOR ART DOCUMENTS

Patent Documents

Patent Document 1: JP-A-2006-036576
Patent Document 2: JP-A-2008-081392
Patent Document 3: JP-A-2015-189655

DISCLOSURE OF THE INVENTION

Problems to be Solved by the Invention

The zirconia-based porous bodies disclosed in Patent Document 1 to 3 have a high specific surface area even after heat treatment. Therefore, when these zirconia-based porous bodies are used as a catalyst carrier, the catalyst can be said to have high catalyst performance even after being exposed to a high temperature. In Patent Documents 1 to 3, in order to obtain a high specific surface area even after heat treatment, the pore volume of mesopores (diameter: 2 to 50 nm) to macropores (diameter: 50 nm or more) of the zirconia-based porous body is increased.

When the zirconia-based porous bodies of Patent Document 1 to 3 are used, a catalyst layer needs to have a certain degree of thickness in order to form an amount of catalyst sufficiently functioning for exhaust gas treatment on a wall of a honeycomb structure while having high catalyst performance even after being exposed to a high temperature. However, when the thickness of the catalyst layer increases, a pressure loss of exhaust gas occurs, whereby the ventilation amount of the exhaust gas in the honeycomb structure decreases, which disadvantageously causes reduction in engine output and deterioration in exhaust gas purification performance.

Conventionally, studies have been made to reduce the thickness of the catalyst layer, thereby reducing the pressure loss, but it is necessary to keep exhaust gas purifying ability at a certain level or more in order to reduce the pressure loss, which has a limit to reduce the thickness. Also in Patent Documents 1 to 3, there is room for improvement from the viewpoint of achieving both the exhaust gas purifying ability and the reduction in the pressure loss.

The present invention has been made in view of the above-described problems, and an object of the present invention is to provide a zirconia-based composite oxide capable of forming an amount of catalyst sufficiently functioning for exhaust gas treatment on a wall of a honeycomb structure even if the thickness of a catalyst layer is reduced. Another object of the present invention is to provide a method for manufacturing the zirconia-based composite oxide.

Means for Solving the Problems

The present inventors have intensively studied a zirconia-based composite oxide. As a result, the present inventors surprisingly found that the use of a zirconia-based composite oxide having a high specific surface area even after heat treatment and a high tap bulk density makes it possible to form an amount of catalyst sufficiently functioning for exhaust gas treatment on a wall of a honeycomb structure even if the thickness of a catalyst layer is reduced, thereby completing the present invention.

That is, a zirconia-based composite oxide according to the present invention has a tap bulk density of 0.75 g/ml or more and a specific surface area of 45 m²/g or more after heat treatment at 1000° C. for 3 hours.

In general, in the manufacture of a catalytic converter, a honeycomb structure is coated with a slurry which contains a composite oxide supporting a catalyst such as a noble metal, and a catalyst layer is formed through drying and firing steps. The present inventors have paid attention to a tap bulk density, and have considered that the thickness of the catalyst layer can be reduced by increasing the tap bulk density.

According to the above configuration, the tap bulk density of 0.75 g/ml or more makes it possible to increase the amount of a catalyst supported per unit volume while reducing a coating thickness when forming a slurry and applying the slurry to the honeycomb structure. As a result, the catalyst layer has sufficient exhaust gas purifying ability even if the catalyst layer is thin. According to the above configuration, the specific surface area after heat treatment at 1000° C. for 3 hours is 45 m$^2$/g or more, whereby the zirconia-based composite oxide can be said to have a high specific surface area even after heat treatment. Therefore, the catalyst can be said to have high catalytic performance even after being exposed to a high temperature.

As described above, the above configuration makes it possible to form an amount of catalyst sufficiently functioning for exhaust gas treatment on a wall of the honeycomb structure even if the thickness of the catalyst layer is reduced.

In the above configuration, the tap bulk density is preferably 0.8 g/ml or more and 1.3 g/ml or less.

In the above configuration, the tap bulk density is preferably 0.83 g/ml or more and 1.27 g/ml or less.

In the above configuration, the specific surface area after heat treatment at 1000° C. for 3 hours is preferably 47 m$^2$/g or more and 100 m$^2$/g or less.

In the above configuration, zirconia-based composite oxide preferably has a specific surface area of 15 m$^2$/g or more and 70 m$^2$/g or less after heat treatment at 1100° C. for 3 hours.

When the specific surface area after heat treatment at 1100° C. for 3 hours is 15 m$^2$/g or more, the catalyst can be said to have high catalyst performance even after being exposed to a higher temperature.

In the above configuration, the zirconia-based composite oxide preferably has a specific surface area of 45 m$^2$/g or more and 150 m$^2$/g or less.

When the specific surface area is 45 m$^2$/g or more, the zirconia-based composite oxide can be said to have a relatively high specific surface area in a state before heat treatment (before being exposed to a higher temperature).

In the above configuration, a ratio of a pore volume of pores having a diameter of 100 nm or more and 1000 nm or less to a total pore volume in a pore distribution based on a mercury intrusion method is preferably 17% or less of the total pore volume.

When the ratio of the pore volume of pores having a diameter of 100 nm or more and 1000 nm or less to a total pore volume in a pore distribution based on a mercury intrusion method is 17% or less of the total pore volume, the tap bulk density of 0.75 g/ml or more and the specific surface area of 45 m$^2$/g or more after heat treatment at 1000° C. for 3 hours can be easily achieved. This is due to the fact that the present inventors have found the following.

The present inventors have found the following related to the relationship between the pore size and physical properties of the zirconia-based composite oxide:

(1) Pores having a diameter of 10 to 100 nm are formed by the aggregation of primary particles;

(2) By increasing the volume of the pores having a diameter of 10 to 100 nm, the specific surface area after heat treatment can be increased;

(3) The influence of the volume of pores having a diameter of 100 nm or more on the specific surface area after heat treatment is small; and (4) The volume of the pores having a diameter of 100 nm or more greatly affects the tap bulk density of the zirconia-based composite oxide.

The present inventors have considered that the tap bulk density can be increased by reducing the volume of the pores having a diameter of 100 nm or more according to the above findings. That is, the present inventors have considered that, by increasing the volume of the pores having a diameter of 10 to 100 nm, of the zirconia-based composite oxide and decreasing the volume of the pores of 100 nm or more, the specific surface area of the zirconia-based composite oxide after heat treatment can be highly maintained, and the tap bulk density can be increased. As a result, the present inventors have found that, when the pore volume of pores having a diameter of 100 nm or more and 1000 nm or less in a pore distribution based on a mercury intrusion method is 17% or less of the total pore volume, the tap bulk density of 0.75 g/ml or more and the specific surface area of 45 m$^2$/g or more after heat treatment at 1000° C. for 3 hours can be easily achieved.

In the above configuration, the particle size $D_{50}$ is preferably 5 μm or more and 25 μm or less.

When the particle size $D_{50}$ is 5 μm or more and 25 μm or less, the tap bulk density is likely to be increased.

In the above configuration, the content of zirconia is preferably 30 mass % or more and 95 mass % or less based on 100 mass % of the entire zirconia-based composite oxide.

When the content of zirconia is 30 mass % or more and 95 mass % or less, the zirconia-based composite oxide can be suitably used as a catalyst carrier.

In the above configuration, the zirconia-based composite oxide preferably contains oxides of one or more selected from rare earth elements other than Pm.

When the zirconia-based composite oxide contains the oxides of one or more selected from rare earth elements other than Pm, the thermal stability of the specific surface area can be improved. That is, the amount of a change in the specific surface area can be reduced before and after being exposed to a high temperature, and as a result, the catalytic performance can be prevented from being significantly reduced.

A method for manufacturing a zirconia-based composite oxide according to the present invention is a method for manufacturing the zirconia-based composite oxide. The method includes:

a first step including a step of adding a sulfating agent to a zirconium salt solution having a temperature of 100° C. or higher while stirring the zirconium salt solution at stirring Reynolds number of 400 or more and 2000 or less, and a step of cooling the zirconium salt solution to which the sulfating agent has been added to 60° C. or lower; and a second step including a step of heating the cooled solution obtained in the first step to a temperature of 100° C. or higher while stirring the solution at stirring Reynolds number of 10 or more and 350 or less.

In the above configuration, the sulfating agent is added to the zirconium salt solution having a temperature of 100° C. or higher while stirring the zirconium salt solution at stirring Reynolds number of 400 or more and 2000 or less in the first step.

The first step is a step of controlling the formation/aggregation of the primary particles, in other words, a step of controlling the volume of pores having a diameter of 10 to 100 nm. Therefore, the reaction conditions of the first step greatly affect the heat resistance for maintaining the specific surface area (specific surface area after heat treatment). The aggregation state of the primary particles is dominated by chemical factors such as a reaction temperature and physical factors such as a shear stress due to a turbulence flow. In the first step, the aggregation state of the primary particles is controlled by controlling the temperature to 100° C. or higher and the stirring Reynolds number to 400 or more and 2000 or less, and the volume of the pores having a diameter of 10 to 100 nm is controlled to fall within a suitable range (to be increased).

In the above configuration, in the second step, the cooled solution obtained in the first step is heated to a temperature of 100° C. or higher while being stirred at stirring Reynolds number of 10 or more and 350 or less.

The second step is a step of further controlling the aggregation state of a basic zirconium sulfate slurry obtained in the first step. In the second step, the stirring is performed with a laminar flow having stirring Reynolds number of 10 or more and 350 or less to control the size of secondary or higher-order particles, and the volume of the pores having a diameter of 100 nm or more is controlled to fall within a suitable range (to be reduced).

As described above, according to the method for manufacturing a zirconia-based composite oxide, a zirconia-based composite oxide having a large volume of pores having a diameter of 10 to 100 nm and a small volume of pores having a diameter of 10 to 100 nm can be easily manufactured, whereby a zirconia-based composite oxide having a tap bulk density of 0.75 g/ml or more and a specific surface area of 45 m$^2$/g or more after heat treatment at 1000° C. for 3 hours can be easily manufactured.

In the above configuration, the stirring Reynolds number in the second step is preferably 50 or more and 300 or less.

In the above configuration, the stirring Reynolds number in the first step is preferably 600 or more and 1800 or less.

In the above configuration, the temperature during stirring in the first step is preferably 105° C. or higher and 200° C. or lower.

In the above configuration, the temperature during stirring in the second step is preferably 105° C. or higher and 180° C. or lower.

Effect of the Invention

The present invention can provide a zirconia-based composite oxide capable of forming an amount of catalyst sufficiently functioning for exhaust gas treatment on a wall of a honeycomb structure even if the thickness of a catalyst layer is reduced. The present invention can provide a method for manufacturing the zirconia-based composite oxide.

BRIEF DESCRIPTION OF THE DRAWINGS

FIG. 1 is a diagram showing the pore distribution of a zirconia-based composite oxide of each of Example 1 and Comparative Example 1.

MODE FOR SUPPORTING OUT THE
INVENTION

Hereinafter, embodiments of the present invention will be described. However, the present invention is not limited only to these embodiments. In the present specification, general zirconia is used, and contains 10 mass % or less of an impurity metal compound including hafnia.

[Zirconia-Based Composite Oxide]

A zirconia-based composite oxide according to the present embodiment will be described in detail later, but the zirconia-based composite oxide contains zirconia as an essential component, and is a composite oxide with an oxide other than zirconia (other metal oxide). The application of the zirconia-based composite oxide according to the present embodiment is not particularly limited, but the zirconia-based composite oxide is useful as a catalyst carrier for exhaust gas purification. When the zirconia-based composite oxide is used as the catalyst carrier for exhaust gas purification, examples of a catalyst which can be supported include a noble metal catalyst.

<Tap Bulk Density>

The zirconia-based composite oxide according to the present embodiment has a tap bulk density of 0.75 g/ml or more. The tap bulk density of 0.75 g/ml or more makes it possible to increase the amount of the catalyst carrier per unit volume while reducing a coating thickness when forming a slurry and applying the slurry to a honeycomb structure. As a result, the catalyst layer has sufficient exhaust gas purifying ability even if the catalyst layer is thin.

The present inventors confirm that the amount of the catalyst carrier per unit volume in the catalyst layer after applying the slurry containing the zirconia-based composite oxide is proportional to the tap bulk density of the zirconia-based composite oxide.

The tap bulk density is preferably 0.8 g/ml or more, more preferably 0.83 g/ml or more, still more preferably 0.85 g/ml or more, and particularly preferably 0.9 g/ml or more. The upper limit of the tap bulk density is not particularly limited, but is preferably 1.3 g/ml or less, more preferably 1.27 g/ml or less, still more preferably 1.25 g/ml or less, particularly preferably 1.2 g/ml or less, and especially preferably 1.15 g/ml.

<Specific Surface Area>

The zirconia-based composite oxide has a specific surface area of 45 m$^2$/g or more after heat treatment at 1000° C. for 3 hours. The zirconia-based composite oxide has a specific surface area of 45 m$^2$/g or more after heat treatment at 1000° C. for 3 hours, whereby the zirconia-based composite oxide can be said to have a high specific surface area even after heat treatment. That is, it is possible to suppress deterioration (aggregation and enlargement) in a noble metal supported on the zirconia-based composite oxide as the carrier. Therefore, the catalyst can be said to have high catalytic performance even after being exposed to a high temperature.

The specific surface area after heat treatment at 1000° C. for 3 hours is preferably 47 m$^2$/g or more, more preferably 50 m$^2$/g or more, and still more preferably 53 m$^2$/g or more.

The upper limit of the specific surface area after heat treatment at 1000° C. for 3 hours is not particularly limited, but is preferably 100 m$^2$/g or less, more preferably 95 m$^2$/g or less, and still more preferably 90 m$^2$/g or less.

The specific surface area after heat treatment at 1000° C. for 3 hours is generally lower than that before heat treatment.

The zirconia-based composite oxide preferably has a specific surface area of 15 m$^2$/g or more after heat treatment at 1100° C. for 3 hours. When the specific surface area after heat treatment at 1100° C. for 3 hours is 15 m$^2$/g or more, the catalyst can be said to have high catalyst performance even after being exposed to a higher temperature.

The specific surface area after heat treatment at 1100° C. for 3 hours is more preferably 17 $m^2/g$ or more, still more preferably 20 $m^2/g$ or more, and particularly preferably 23 $m^2/g$ or more.

The upper limit of the specific surface area after heat treatment at 1100° C. for 3 hours is not particularly limited, but is preferably 70 $m^2/g$ or less, more preferably 65 $m^2/g$ or less, and still more preferably 60 $m^2/g$ or less.

The specific surface area after heat treatment at 1100° C. for 3 hours is generally lower than that before heat treatment or after heat treatment at 1000° C. for 3 hours.

The zirconia-based composite oxide preferably has a specific surface area (initial specific surface area) of 45 $m^2/g$ or more and 150 $m^2/g$ or less. When the specific surface area is 45 $m^2/g$ or more and 150 $m^2/g$ or less, the zirconia-based composite oxide can be said to have a relatively high specific surface area in a state before heat treatment (before being exposed to a high temperature). Here, the specific surface area (initial specific surface area) refers to a specific surface area in a state where heat treatment or pulverization treatment or the like is not performed after the zirconia-based composite oxide is manufactured.

The specific surface area (initial specific surface area) is preferably 45 $m^2/g$ or more, more preferably 50 $m^2/g$ or more, and still more preferably 55 $m^2/g$ or more.

The upper limit of the specific surface area is not particularly limited, but is preferably 150 $m^2/g$ or less, more preferably 145 $m^2/g$ or less, still more preferably 140 $m^2/g$ or less, particularly preferably 135 $m^2/g$ or less, and especially preferably 130 $m^2/g$ or less.

The specific surface area after heat treatment at 1000° C. for 3 hours, the specific surface area after heat treatment at 1100° C. for 3 hours, and the specific surface area (initial specific surface area) refer to values obtained by a method described in Examples.

<Pore Volume>

In the zirconia-based composite oxide according to the present embodiment, a ratio of a pore volume of pores having a diameter of 100 nm or more and 1000 nm or less to a total pore volume (hereinafter, also referred to as "pore volume ratio A") is preferably 17% or less of the total pore volume. When the pore volume ratio A is 17% or less of the total pore volume, the tap bulk density of 0.75 g/ml or more and the specific surface area of 45 $m^2/g$ or more after heat treatment at 1000° C. for 3 hours can be easily achieved. This is also clear from Examples.

The pore volume ratio A is more preferably 15% or less, still more preferably 12% or less, and particularly preferably 10% or less. The lower limit of the pore volume ratio A is not particularly limited, but is preferably 0.1% or more, and more preferably 0.3% or more.

The total pore volume is preferably 0.5 ml/g or more, more preferably 0.7 ml/g or more, and still more preferably 0.8 ml/g or more.

The total pore volume is preferably 2.0 ml/g or less, more preferably 1.9 ml/g or less, and still more preferably 1.8 ml/g or less.

The pore volume of the pores having a diameter of 100 nm or more and 1000 nm or less is preferably 0.01 ml/g or more, more preferably 0.02 ml/g or more, and still more preferably 0.03 ml/g or more.

The pore volume of the pores having a diameter of 100 nm or more and 1000 nm or less is preferably 0.20 ml/g or less, more preferably 0.19 ml/g or less, and still more preferably 0.18 ml/g or less.

The pore volume of pores having a diameter of 10 nm or more and less than 100 nm is preferably 0.20 ml/g or more, more preferably 0.25 ml/g or more, and still more preferably 0.30 ml/g or more. When the pore volume of the pores having a diameter of 10 nm or more and less than 100 nm is 0.20 ml/g or more, the specific surface area after heat treatment at 1000° C. for 3 hours can be further increased.

The pore volume of the pores having a diameter of 10 nm or more and less than 100 nm is preferably 1.00 ml/g or less, more preferably 0.95 ml/g or less, and still more preferably 0.90 ml/g or less.

Details of determination of the total pore volume, the pore volume of the pores having a diameter of 10 nm or more and less than 100 nm, and the pore volume of the pores having a diameter of 100 nm or more and 1000 nm or less are based on a method described in Examples.

<Particle Size>

The particle size $D_{50}$ of the zirconia-based composite oxide is preferably 5 μm to 100 μm, more preferably 8 μm to 90 μm, and still more preferably 10 μm to 80 μm. When the particle size $D_{50}$ is 5 μm or more and 100 μm or less, the tap bulk density is likely to be increased. That is, when the particle size $D_{50}$ is too small, the tap bulk density tends to be low, but by relatively increasing the particle size $D_{50}$ (for example, 5 μm to 100 μm) as in the present embodiment, the tap bulk density is likely to be increased.

As the particle size $D_{50}$ is smaller, the zirconia-based composite oxide is not likely to be densely packed. Rather, the zirconia-based composite oxide is porous, whereby the zirconia-based composite oxide has a light mass per unit volume, and does not have a true sphere shape. Therefore, the tap bulk density tends to be smaller as the particle size $D_{50}$ is smaller.

The particle size $D_{50}$ refers to a particle size in a state where the zirconia-based composite oxide is manufactured, and then not pulverized or heat-treated. The above "pulverizing" refers to finely pulverizing, and pulverizing due to a general technique such as a planetary mill, a ball mill, or a jet mill.

The particle size $D_{50}$ refers to a value obtained by a method described in Examples.

<Composition>

The zirconia-based composite oxide contains zirconia. The content of the zirconia is preferably 30 mass % or more, more preferably 35 mass % or more, still more preferably 40 mass % or more, and particularly preferably 45 mass % or more, based on 100 mass % of the entire zirconia-based composite oxide. The upper limit of the content of the zirconia is not particularly limited, but the content of the zirconia is preferably 95 mass % or less, more preferably 92 mass % or less, still more preferably 90 mass % or less, and particularly preferably 85 mass % or less. When the content of the zirconia is 30 mass % or more and 95 mass % or less, the zirconia can be suitably used as the catalyst carrier.

The zirconia-based composite oxide preferably contains oxides of one or more selected from rare earth elements.

The rare earth elements refer to Sc, Y, La, Ce, Pr, Nd, Pm, Sm, Eu, Gd, Tb, Dy, Ho, Er, Tm, Yb, and Lu. However, it is preferable that the zirconia-based composite oxide does not contain Pm. That is, it is more preferable that the zirconia-based composite oxide contains oxides of one or more selected from rare earth elements other than Pm.

When the zirconia-based composite oxide contains the oxides of one or more selected from rare earth elements other than Pm, the thermal stability of the specific surface area can be improved. That is, the amount of a change in the specific surface area can be reduced before and after being exposed to a high temperature, and as a result, the catalytic performance can be prevented from being significantly reduced.

Among the rare earth elements, Y (yttrium), La (lanthanum), Ce (cerium), Nd (neodymium), and Pr (praseodymium) are preferable. Among these, Y, La, and Ce are more preferable; La and Ce are still more preferable; and Ce is particularly preferable. That is, the zirconia-based composite oxide preferably contains one or more oxides selected from the group consisting of lanthanum oxide, cerium oxide, neodymium oxide, praseodymium oxide, and yttrium oxide.

The zirconia-based composite oxide can contain, in addition to zirconia and the oxides of the rare earth elements, oxides of one or more elements selected from the group consisting of A) oxides of one or more selected from the group consisting of In, Si, Sn, Bi, and Zn, B) transition metal oxides (excluding oxides of rare earth elements and noble metal elements), and C) alkaline earth metal oxides.

Hereinafter, the elements shown in A) to C) are referred to as "other elements" herein. When the zirconia-based composite oxide contains oxides of the other elements, the content of the oxides of the other elements may be 0.1 mass % or more in terms of oxide based on 100 mass % of the entire zirconia-based composite oxide. The upper limit of the content of the oxides of the other elements is not particularly limited, but may be 20 mass % or less, 10 mass % or less, 7 mass % or less, or 5 mass % or less or the like.

Examples of the transition metal include Ti, V, Cr, Mn, Fe, Co, Ni, Cu, Nb, Mo, Ta, and W. Examples of the alkaline earth metal include Mg, Ca, Sr, and Ba.

Preferable composition ratios of the zirconia-based composite oxide include combinations not exceeding 100% in total exemplified in the following (1) to (4).

(1) Zirconia; 30% or more and 95% or less
   Ceria; 0% or more and 70% or less
   Oxides of rare earth elements other than ceria; 0% or more and 30% or less
   Oxides of other elements; 0% or more and 20% or less
(2) Zirconia; 35% or more and 92% or less
   Ceria; 5% or more and 65% or less
   Oxides of rare earth elements other than ceria; 0% or more and 25% or less
   Oxides of other elements; 0% or more and 10% or less
(3) Zirconia; 40% or more and 90% or less
   Ceria; 10% or more and 60% or less
   Oxides of rare earth elements other than ceria; 0% or more and 20% or less
   Oxides of other elements; 0% or more and 7% or less
(4) Zirconia; 45% or more and 85% or less
   Ceria; 10% or more and 55% or less
   Oxides of rare earth elements other than ceria; 0% or more and 20% or less
   Oxides of other elements; 0% or more and 5% or less The composition of the zirconia-based composite oxide is specified by a method described in Examples.

According to the zirconia-based composite oxide according to the present embodiment, the tap bulk density is 0.75 g/ml or more, and the specific surface area after heat treatment at 1000° C. for 3 hours is 45 m²/g or more, whereby an amount of catalyst sufficiently functioning for exhaust gas treatment can be formed on the wall of the honeycomb structure even if the thickness of the catalyst layer is reduced. As a result, a pressure loss caused by the thickness of the catalyst layer can be reduced, whereby the fuel consumption of an automobile or the like can be improved. The amount of the catalyst that can be coated per unit volume increases, whereby oxygen storage capacity (OSC) per unit volume can be improved. The OSC per unit volume is improved, and as a result, the catalyst performance can be improved.

[Method for Manufacturing Zirconia-Based Composite Oxide]

Hereinafter, one example of a method for manufacturing a zirconia-based composite oxide will be described. However, the method for manufacturing a zirconia-based composite oxide of the present invention is not limited to the following exemplification.

The method for manufacturing a zirconia-based composite oxide according to the present embodiment includes:

a first step including a step of adding a sulfating agent to a zirconium salt solution having a temperature of 100° C. or higher while stirring the zirconium salt solution at stirring Reynolds number of 400 or more and 2000 or less, and a step of cooling the zirconium salt solution to which the sulfating agent has been added to 60° C. or lower; and a second step including a step of heating the cooled solution obtained in the first step to a temperature of 100° C. or higher while stirring the solution at stirring Reynolds number of 10 or more and 350 or less.

<First Step>

In the method for manufacturing a zirconia-based composite oxide according to the present embodiment, first, a sulfating agent is added to a zirconium salt solution having a temperature of 100° C. or higher while the zirconium salt solution is stirred at stirring Reynolds number of 400 or more and 2000 or less (first-first step).

Here, the stirring Reynolds number ($Re_d$) will be described.

The stirring Reynolds number ($Re_d$) is represented by the following formula:

$$Re_d = \rho n d^2 / \mu$$

d: blade diameter [m]
n: blade rotation speed [s⁻¹]
ρ: density [kg/m³]
μ: viscosity [Pas]

Usually, when the stirring Reynolds number is 10 or less, the stirred solution is in a strict laminar flow state where a flow in a rotation direction is mainly generated. When the stirring Reynolds number exceeds 10, a discharge flow from a blade is gradually generated, whereby a circulating flow occurs in a tank. Furthermore, when the stirring Reynolds number is 400 or more, a turbulence flow starts to occur. The stirring Reynolds number of from several hundreds to several thousands is considered as a transition state, and is a state where a turbulence flow starts to be generated in the vicinity of the blade and a laminar flow remains in the vicinity of a tank wall and a tank bottom placed away from the blade.

The first-first step is a step of controlling the formation/aggregation of primary particles, in other words, a step of controlling the volume of pores having a diameter of 10 to 100 nm. Therefore, the reaction conditions of the first step greatly affect the heat resistance for maintaining the specific surface area (specific surface area after heat treatment). The aggregation state of the primary particles is dominated by chemical factors such as a reaction temperature and physical factors such as a shear stress due to a turbulence flow. In the first step, the aggregation state of the primary particles is controlled by controlling the temperature to 100° C. or higher and the stirring Reynolds number to 400 or more and 2000 or less, and the volume of the pores having a diameter of 10 to 100 nm is controlled to fall within a suitable range (to be increased).

As described above, in the first-first step, the sulfating agent is added to the zirconium salt solution having a temperature of 100° C. or higher while the zirconium salt solution is stirred at stirring Reynolds number of 400 or more and 2000 or less, which is turbulence flow, so that fine primary particles are likely to be generated.

The stirring Reynolds number in the first-first step is preferably 500 or more, more preferably 600 or more, still more preferably 700 or more, and particularly preferably 800 or more. The stirring Reynolds number in the first-first step is preferably 1900 or less, more preferably 1800 or less, still more preferably 1700 or less, and particularly preferably 1600 or less.

A temperature during stirring in the first-first step is preferably 105° C. or higher, more preferably 110° C. or higher, and still more preferably 115° C. or higher. The temperature during stirring in the first-first step is preferably 200° C. or lower, more preferably 195° C. or lower, and still more preferably 190° C. or lower.

The zirconium salt solution and the sulfating agent usually react with each other at a temperature of 65° C. or higher to form basic zirconium sulfate. Therefore, in the present embodiment, by setting the temperature during stirring in the first step to 100° C. or higher, a sulfation reaction is appropriately accelerated, whereby fine primary particles are likely to be formed. When the temperature during stirring in the first step is too low, the sulfation reaction is delayed, whereby large aggregated particles tend to be easily formed.

A pressure in the first-first step is not particularly limited, but is preferably $1.0 \times 10^5$ Pa or more, and more preferably $1.2 \times 10^5$ or more. The pressure is not particularly limited, but is preferably $1.5 \times 10^6$ Pa or less, and more preferably $1.4 \times 10^6$ Pa or less.

The sulfating agent is preferably added at the same temperature as that of the zirconium salt solution. The zirconium salt solution reacts with the sulfating agent to form basic zirconium sulfate.

The zirconium salt is only required to supply zirconium ions, and for example, zirconium oxynitrate, zirconium oxychloride, and zirconium nitrate and the like can be used. One or two or more thereof may be used. Among these, zirconium oxychloride is preferable in terms of its high productivity on an industrial scale.

A solvent for forming a zirconium salt solution may be selected according to the type of the zirconium salt. Usually, water (pure water or ion-exchanged water, the same applies hereinafter) is preferable.

The concentration of the zirconium salt solution is not particularly limited, but generally, 5 to 250 g (particularly, 20 to 150 g) of zirconium oxide ($ZrO_2$) is desirably contained in 1000 g of the solvent.

The sulfating agent is not limited as long as the sulfating agent reacts with zirconium ions to form a sulfate (that is, a sulfating reagent), and examples thereof include sodium sulfate, potassium sulfate, and ammonium sulfate. The sulfating agent may be in any form such as a powder or solution form, but a solution (particularly, an aqueous solution) is preferable. The concentration of the solution to be used can be appropriately set.

The sulfating agent is preferably added so that the weight ratio of sulfate radical ($SO_4^{2-}$)

to $ZrO_2$ is 0.3 to 0.6. The free acid concentration of a mixed solution is preferably 0.2 to 2.2 N (normal). Examples of the free acid include sulfuric acid, nitric acid, and hydrochloric acid. The type of the free acid is not limited, but hydrochloric acid is preferable in terms of its high productivity on an industrial scale.

After the sulfating agent is added (after the first-first step), the reaction liquid is preferably held for 10 to 60 minutes to age the formed basic zirconium sulfate (first-second step). The basic zirconium sulfate is not limited, and examples thereof include hydrates of compounds such as $ZrOSO_4 \cdot ZrO_2$, $5ZrO_2 \cdot 3SO_3$, and $7ZrO_2 \cdot 3SO_3$. The basic zirconium sulfate may be one or a mixture of two or more thereof.

In the step of holding the reaction liquid for 10 to 60 minutes (first-second step), it is preferable to continue the stirring in the first-first step as it is.

Then (after the first-second step), the reaction liquid is cooled to 60° C. or lower (first-third step).

The cooling is preferably 50° C. or lower, and more preferably 40° C. or lower. The lower limit temperature for the cooling is not particularly limited, but is preferably a temperature at which the reaction liquid is not frozen, and examples thereof include 10° C. or higher and 20° C. or higher. The cooling rate does not need to be particularly controlled, and may be natural cooling. However, when the scale is large, it takes time to perform natural cooling, whereby the cooling may be performed using a heat exchanger or the like. In this case, the cooling rate may be appropriately set within a range of, for example, 0.1° C./min or more and 20° C./min or less.

The first step has been described above.

<Second Step>

After the first step, the cooled solution obtained in the first step is heated to a temperature of 100° C. or higher while being stirred at stirring Reynolds number of 10 or more and 350 or less (second-first step).

The second-first step is a step of further controlling the aggregation state of the basic zirconium sulfate slurry obtained in the first step. In the second step, the stirring is performed with a laminar flow having stirring Reynolds number of 10 or more and 350 or less to control the size of secondary or higher-order particles, and the volume of the pores having a diameter of 100 nm or more is controlled to fall within a suitable range (to be reduced).

As described above, in the second-first step, in order to accelerate the aggregation of the particles, the solution is heated to a temperature of 100° C. or higher while being stirred at stirring Reynolds number of 10 or more and 350 or less so that only a laminar flow occurs without generating a turbulence flow.

A heating rate is not particularly limited, but may be appropriately set in a range of 0.1° C./min or more and 10° C./min or less.

The stirring Reynolds number in the second-first step is 10 or more, preferably 20 or more, more preferably 50 or more, and still more preferably 100 or more. The stirring Reynolds number in the second-first step is 350 or less, preferably 300 or less, more preferably 250 or less, and still more preferably 220 or less.

In the second-first step, the stirring is performed at stirring Reynolds number of 10 or more and 350 or less to generate a laminar flow in a reaction tank, whereby the aggregation can be accelerated in the sulfation reaction. As a result, the volume of the pores having a diameter of 100 nm or more can be reduced to provide a powder having a high tap bulk density.

A heating temperature in the second-first step is preferably 105° C. or higher, more preferably 110° C. or higher, and still more preferably 115° C. or higher. A temperature during stirring in the second-first step is preferably 180° C. or lower, more preferably 175° C. or lower, and still more preferably 170° C. or lower.

A pressure in the second-first step is not particularly limited, but is preferably $1.0 \times 10^5$ Pa or more, and more preferably $1.2 \times 10^5$ or more. The pressure is not particularly limited, but is preferably $1.5 \times 10^6$ Pa or less, and more preferably $1.4 \times 10^6$ Pa or less.

After the temperature reaches 100° C. or higher, the reaction liquid is preferably held for 10 to 60 minutes to age the formed basic zirconium sulfate (second-second step).

In the step of holding the reaction liquid for 10 to 60 minutes (second-second step), it is preferable to continue the stirring in the second-first step as it is.

Then (after the second-second step), the reaction liquid is cooled to 50° C. or lower (second-third step). Thus, a basic zirconium sulfate slurry is obtained.

The cooling may be performed in the same manner as in the first-second step.

The second step has been described above.

Then, when the zirconia-based composite oxide contains oxides of one or more selected from the group consisting of rare earth elements and other elements, salt solutions or compounds of one or two or more metals selected from the group consisting of rare earth elements and other elements are added in predetermined amounts to the basic zirconium sulfate-containing slurry after the second step before a neutralization step to be described later.

The first step and the second step (particularly, the first-first step and the second-first step) are preferably performed in an autoclave in which a temperature and a pressure are easily managed.

Next, zirconium hydroxide is formed by neutralizing the basic zirconium sulfate. Specifically, zirconium hydroxide is formed by neutralizing the basic zirconium sulfate with an alkali. The alkali is not limited, and for example, ammonium hydroxide, ammonium bicarbonate, sodium hydroxide, and potassium hydroxide and the like can be used. Among these, sodium hydroxide is preferable from the viewpoint of industrial cost.

The amount of the alkali added is not particularly limited as long as zirconium hydroxide can be formed as a precipitate from a basic zirconium sulfate solution. Usually, the alkali is added so that the pH of the solution is 11 or more, and preferably 12 or more.

After the neutralization reaction, the zirconium hydroxide-containing solution is preferably held at 35 to 60° C. for 1 hour or more. As a result, the formed precipitate is aged while also facilitating filtration.

Next, the zirconium hydroxide is recovered by a solid-liquid separation method. For example, filtration, centrifugation, and decantation and the like can be used.

After the zirconium hydroxide is recovered, the zirconium hydroxide is preferably washed with water to remove adhered impurities.

The zirconium hydroxide may be dried by natural drying or heat drying.

Next, the zirconium hydroxide is subjected to heat treatment (fired) to obtain a zirconia-based composite oxide. The heat treatment temperature is not particularly limited, but the zirconium hydroxide is preferably subjected to heat treatment at about 400 to 900° C. for about 1 to 5 hours. The heat treatment atmosphere is preferably air or an oxidizing atmosphere.

The obtained zirconia-based composite oxide may be subjected to treatment for disaggregating for the purpose of improving handleability, if necessary.

The method for manufacturing the zirconia-based composite oxide according to the present embodiment has been described above.

EXAMPLES

Hereinafter, the present invention will be described in detail with reference to Examples, but the present invention is not limited to the following Examples as long as the gist thereof is not deviated. A zirconia-based composite oxide obtained in each of Examples and Comparative Examples contains 1.3 to 2.5 mass % of hafnium oxide as an unavoidable impurity with respect to zirconium oxide (calculated by the following formula (X)).

$$([\text{Mass of Hafnium Oxide}]/([\text{Mass of Zirconium Oxide}]+[\text{Mass of Hafnium Oxide}])) \times 100(\%) \quad <\text{Formula (X)>}$$

Preparation of Zirconia-Based Composite Oxide

Example 1

144 g (55 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.
<First Step>

The obtained zirconium salt solution was placed in an autoclave, and heated to 120° C. with stirring so that stirring Reynolds number was set to 1000. During this time, a pressure was maintained at $2 \times 10^5$ Pa. A temperature at the start of temperature rise was room temperature (25° C.), and a time from the start of temperature rise until the temperature reached 120° C. was 1.5 hours.

After the temperature reached 120° C., 828 g of 5% sodium sulfate (sulfating agent) was immediately added in an autoclave held under conditions of 120° C. and $2 \times 10^5$ Pa, followed by holding as it was for 15 minutes. Also during this time, the stirring (stirring Reynolds number: 1000) was continued.

Then, the mixture was naturally cooled to 50° C. Also during this time, the stirring (stirring Reynolds number: 1000) was continued. A time required for natural cooling to 50° C. was 6 hours.

The above is the first step.
<Second Step>

After the natural cooling, stirring conditions were changed so that stirring Reynolds number was set to 200, and the temperature was risen to 120° C. with stirring. During this time, a pressure was maintained at $2 \times 10^5$ Pa. A time from the start of temperature rise until the temperature reached 120° C. was 1.5 hours.

After the temperature reached 120° C., the temperature was held as it was for 15 minutes. Also during this time, the stirring (stirring Reynolds number: 200) was continued.

Then, the mixture was naturally cooled to 50° C. Also during this time, the stirring (stirring Reynolds number: 200)

was continued. A time required for natural cooling to 50° C. was 6 hours. Thus, a basic zirconium sulfate slurry was obtained.

The above is the second step.

To the obtained basic zirconium sulfate-containing slurry, 400 g of a cerium nitrate solution (40 g in terms of $CeO_2$) and 50 g of a lanthanum nitrate solution (5 g in terms of $La_2O_3$) were added.

Furthermore, 25% sodium hydroxide (neutralizing alkali) was added until the pH reached 13 or higher, to form a hydroxide precipitate (zirconium hydroxide-containing slurry).

The obtained hydroxide precipitate was filtered, and sufficiently washed with water. The obtained hydroxide was dried at 105° C. for 24 hours. The dried hydroxide was subjected to heat treatment (fired) at 600° C. in air for 5 hours. The obtained fired product was loosened with a hammer type head (MF 10.2 hammer type head manufactured by IKA) to obtain a zirconia-based composite oxide according to Example 1.

Example 2

A zirconia-based composite oxide according to Example 2 was obtained in the same manner as in Example 1 except that a stirring condition in a second step was changed to stirring Reynolds number of 100.

Example 3

155 g (60 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.
<First Step>

The obtained zirconium salt solution was placed in an autoclave, and heated to 120° C. with stirring so that stirring Reynolds number was set to 1000. During this time, a pressure was maintained at $2\times10^5$ Pa. A temperature at the start of temperature rise was room temperature (25° C.), and a time from the start of temperature rise until the temperature reached 120° C. was 1.5 hours.

After the temperature reached 120° C., 888 g of 5% sodium sulfate (sulfating agent) was immediately added in an autoclave held under conditions of 120° C. and $2\times10^5$ Pa, followed by holding as it was for 15 minutes. Also during this time, the stirring (stirring Reynolds number: 1000) was continued.

Then, the mixture was naturally cooled to 50° C. Also during this time, the stirring (stirring Reynolds number: 1000) was continued. A time required for natural cooling to 50° C. was 6 hours.

The above is the first step.
<Second Step>

After the natural cooling, stirring conditions were changed so that stirring Reynolds number was set to 200, and the temperature was risen to 120° C. with stirring. During this time, a pressure was maintained at $2\times10^5$ Pa. A time from the start of temperature rise until the temperature reached 120° C. was 1.5 hours.

After the temperature reached 120° C., the temperature was held as it was for 15 minutes. Also during this time, the stirring (stirring Reynolds number: 200) was continued.

Then, the mixture was naturally cooled to 50° C. Also during this time, the stirring (stirring Reynolds number: 200)

was continued. A time required for natural cooling to 50° C. was 6 hours. Thus, a basic zirconium sulfate slurry was obtained.

The above is the second step.

To the obtained basic zirconium sulfate-containing slurry, 250 g of a cerium nitrate solution (25 g in terms of $CeO_2$), 50 g of a lanthanum nitrate solution (5 g in terms of $La_2O_3$), and 100 g of an yttrium nitrate solution (10 g in terms of $Y_2O_3$) were added.

Furthermore, 25% sodium hydroxide (neutralizing alkali) was added until the pH reached 13 or higher, to form a hydroxide precipitate (zirconium hydroxide-containing slurry).

The obtained hydroxide precipitate was filtered, and sufficiently washed with water. The obtained hydroxide was dried at 105° C. for 24 hours. The dried hydroxide was subjected to heat treatment (fired) at 500° C. in air for 5 hours. The obtained fired product was loosened with a hammer type head (MF 10.2 hammer type head manufactured by IKA) to obtain a zirconia-based composite oxide according to Example 3.

Example 4

126 g (48 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.
<First Step>

The obtained zirconium salt solution was placed in an autoclave, and heated to 120° C. with stirring so that stirring Reynolds number was set to 1500. During this time, a pressure was maintained at $2\times10^5$ Pa. A temperature at the start of temperature rise was room temperature (25° C.), and a time from the start of temperature rise until the temperature reached 120° C. was 1.5 hours.

After the temperature reached 120° C., 696 g of 5% sodium sulfate (sulfating agent) was immediately added in an autoclave held under conditions of 120° C. and $2\times10^5$ Pa, followed by holding as it was for 15 minutes. Also during this time, the stirring (stirring Reynolds number: 1500) was continued.

Then, the mixture was naturally cooled to 50° C. Also during this time, the stirring (stirring Reynolds number: 1500) was continued. A time required for natural cooling to 50° C. was 6 hours.

The above is the first step.
<Second Step>

After the natural cooling, stirring conditions were changed so that stirring Reynolds number was set to 200, and the temperature was risen to 120° C. with stirring. During this time, a pressure was maintained at $2\times10^5$ Pa. A time from the start of temperature rise until the temperature reached 120° C. was 1.5 hours.

After the temperature reached 120° C., the temperature was held as it was for 15 minutes. Also during this time, the stirring (stirring Reynolds number: 200) was continued.

Then, the mixture was naturally cooled to 50° C. Also during this time, the stirring (stirring Reynolds number: 200) was continued. A time required for natural cooling to 50° C. was 6 hours. Thus, a basic zirconium sulfate slurry was obtained.

The above is the second step.

To the obtained basic zirconium sulfate-containing slurry, 480 g of a cerium nitrate solution (48 g in terms of $CeO_2$) and 40 g of a lanthanum nitrate solution (4 g in terms of $La_2O_3$) were added.

Furthermore, 25% sodium hydroxide (neutralizing alkali) was added until the pH reached 13 or higher, to form a hydroxide precipitate (zirconium hydroxide-containing slurry).

The obtained hydroxide precipitate was filtered, and sufficiently washed with water. The obtained hydroxide was dried at 105° C. for 24 hours. The dried hydroxide was subjected to heat treatment (fired) at 600° C. in air for 5 hours. The obtained fired product was loosened with a hammer type head (MF 10.2 hammer type head manufactured by IKA) to obtain a zirconia-based composite oxide according to Example 4.

Example 5

209 g (80 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.
<First Step>

The obtained zirconium salt solution was placed in an autoclave, and heated to 120° C. with stirring so that stirring Reynolds number was set to 1000. During this time, a pressure was maintained at $2\times10^5$ Pa. A temperature at the start of temperature rise was room temperature (25° C.), and a time from the start of temperature rise until the temperature reached 120° C. was 1.5 hours.

After the temperature reached 120° C., 1200 g of 5% sodium sulfate (sulfating agent) was immediately added in an autoclave held under conditions of 120° C. and $2\times10^5$ Pa, followed by holding as it was for 15 minutes. Also during this time, the stirring (stirring Reynolds number: 1000) was continued.

Then, the mixture was naturally cooled to 50° C. Also during this time, the stirring (stirring Reynolds number: 1000) was continued. A time required for natural cooling to 50° C. was 6 hours.

The above is the first step.
<Second Step>

After the natural cooling, a stirring condition was changed to stirring Reynolds number of 300, and the temperature was risen to 120° C. with stirring. During this time, a pressure was maintained at $2\times10^5$ Pa. A time from the start of temperature rise until the temperature reached 120° C. was 1.5 hours.

After the temperature reached 120° C., the temperature was held as it was for 15 minutes. Also during this time, the stirring (stirring Reynolds number: 300) was continued.

Then, the mixture was naturally cooled to 50° C. Also during this time, the stirring (stirring Reynolds number: 300) was continued. A time required for natural cooling to 50° C. was 6 hours. Thus, a basic zirconium sulfate slurry was obtained.

The above is the second step.

To the obtained basic zirconium sulfate-containing slurry, 100 g of a neodymium nitrate solution (10 g in terms of $Nd_2O_3$) and 100 g of a praseodymium nitrate solution (10 g in terms of $Pr_6O_{11}$) were added.

Furthermore, 25% sodium hydroxide (neutralizing alkali) was added until the pH reached 13 or higher, to form a hydroxide precipitate (zirconium hydroxide-containing slurry).

The obtained hydroxide precipitate was filtered, and sufficiently washed with water. The obtained hydroxide was dried at 105° C. for 24 hours. The dried hydroxide was subjected to heat treatment (fired) at 500° C. in air for 5 hours. The obtained fired product was loosened with a hammer type head (MF 10.2 hammer type head manufactured by IKA) to obtain a zirconia-based composite oxide according to Example 5.

Example 6

84 g (32 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.
<First Step>

The obtained zirconium salt solution was placed in an autoclave, and heated to 120° C. with stirring so that stirring Reynolds number was set to 500. During this time, a pressure was maintained at $2\times10^5$ Pa. A temperature at the start of temperature rise was room temperature (25° C.), and a time from the start of temperature rise until the temperature reached 120° C. was 1.5 hours.

After the temperature reached 120° C., 475 g of 5% sodium sulfate (sulfating agent) was immediately added in an autoclave held under conditions of 120° C. and $2\times10^5$ Pa, followed by holding as it was for 15 minutes. Also during this time, the stirring (stirring Reynolds number: 500) was continued.

Then, the mixture was naturally cooled to 50° C. Also during this time, the stirring (stirring Reynolds number: 500) was continued. A time required for natural cooling to 50° C. was 6 hours.

The above is the first step.
<Second Step>

After the natural cooling, stirring conditions were changed so that stirring Reynolds number was set to 200, and the temperature was risen to 120° C. with stirring. During this time, a pressure was maintained at $2\times10^5$ Pa. A time from the start of temperature rise until the temperature reached 120° C. was 1.5 hours.

After the temperature reached 120° C., the temperature was held as it was for 15 minutes. Also during this time, the stirring (stirring Reynolds number: 200) was continued.

Then, the mixture was naturally cooled to 50° C. Also during this time, the stirring (stirring Reynolds number: 200) was continued. A time required for natural cooling to 50° C. was 6 hours. Thus, a basic zirconium sulfate slurry was obtained.

The above is the second step.

To the obtained basic zirconium sulfate-containing slurry, 500 g of a cerium nitrate solution (50 g in terms of $CeO_2$), 60 g of a lanthanum nitrate solution (6 g in terms of $La_2O_3$), and 120 g of an yttrium nitrate solution (12 g in terms of $Y_2O_3$) were added.

Furthermore, 25% sodium hydroxide (neutralizing alkali) was added until the pH reached 13 or higher, to form a hydroxide precipitate (zirconium hydroxide-containing slurry).

The obtained hydroxide precipitate was filtered, and sufficiently washed with water. The obtained hydroxide was dried at 105° C. for 24 hours. The dried hydroxide was subjected to heat treatment (fired) at 500° C. in air for 5 hours. The obtained fired product was loosened with a hammer type head (MF 10.2 hammer type head manufactured by IKA) to obtain a zirconia-based composite oxide according to Example 6.

Example 7

A zirconia-based composite oxide according to Example 7 was obtained in the same manner as in Example 1 except that a temperature risen in a first step was changed to 150° C.

Example 8

A zirconia-based composite oxide according to Example 8 was obtained in the same manner as in Example 1 except that a temperature risen in a second step was changed to 150° C.

Comparative Example 1

145 g (56 g in terms of $ZrO_2$) of zirconium oxychloride-octahydrate was dissolved in ion-exchanged water, and an acid concentration and a $ZrO_2$ concentration were then respectively adjusted to 0.67 N and 4 w/v % (mass-volume percent concentration) by 35 mass % hydrochloric acid and ion-exchanged water to obtain a zirconium salt solution.
<First Step>
The obtained zirconium salt solution was placed in an autoclave, and heated to 120° C. with stirring so that stirring Reynolds number was set to 1000. During this time, a pressure was maintained at $2 \times 10^5$ Pa. A temperature at the start of temperature rise was room temperature (25° C.), and a time from the start of temperature rise until the temperature reached 120° C. was 1.5 hours.

After the temperature reached 120° C., 828 g of 5% sodium sulfate (sulfating agent) was immediately added in an autoclave held under conditions of 120° C. and $2 \times 10^5$ Pa, followed by holding as it was for 15 minutes. Also during this time, the stirring (stirring Reynolds number: 1000) was continued.

Then, the mixture was naturally cooled to 50° C. Also during this time, the stirring (stirring Reynolds number: 1000) was continued. A time required for natural cooling to 50° C. was 6 hours.

The above is the first step.

The above processes are the same as those of Example 1. Then, the following steps were performed without performing a second step.

To the obtained basic zirconium sulfate-containing slurry, 400 g of a cerium nitrate solution (40 g in terms of $CeO_2$) and 40 g of a lanthanum nitrate solution (4 g in terms of $La_2O_3$) were added.

Furthermore, 25% sodium hydroxide (neutralizing alkali) was added until the pH reached 13 or higher, to form a hydroxide precipitate (zirconium hydroxide-containing slurry).

The obtained hydroxide precipitate was filtered, and sufficiently washed with water. The obtained hydroxide was dried at 105° C. for 24 hours. The dried hydroxide was subjected to heat treatment (fired) at 600° C. in air for 5 hours. The obtained fired product was loosened with a hammer type head (MF 10.2 hammer type head manufactured by IKA) to obtain a zirconia-based composite oxide according to Comparative Example 1.

Comparative Example 2

A zirconia-based composite oxide according to Comparative Example 2 was obtained in the same manner as in Example 3 except that a second step was not performed.

Comparative Example 3

A zirconia-based composite oxide according to Comparative Example 3 was obtained in the same manner as in Example 4 except that a second step was not performed.

Comparative Example 4

A zirconia-based composite oxide according to Comparative Example 4 was obtained in the same manner as in Example 1 except that a stirring condition in a second step was changed to stirring Reynolds number of 1000.

Comparative Example 5

A zirconia-based composite oxide according to Comparative Example 5 was obtained in the same manner as in Example 1 except that a temperature risen in a first step was changed to 80° C.

Comparative Example 6

A zirconia-based composite oxide according to Comparative Example 6 was obtained in the same manner as in Example 1 except that a temperature risen in a second step was changed to 80° C.

Comparative Example 7

A first step was performed in the same manner as in Example 1 except that a stirring condition in the first step was changed to stirring Reynolds number of 200, but a uniform slurry was not obtained, and a desired product was not obtained.
[Measurement of Composition of Zirconia-Based Composite Oxide]
The composition (in terms of oxide) of the zirconia-based composite oxide of each of Examples and Comparative Examples was analyzed using ICP-AES ("ULTIMA-2" manufactured by HORIBA LTD.). The results are shown in Tables 1 and 2.
[Measurement of Pore Volume]
The pore distribution of the zirconia-based composite oxide of each of Examples and Comparative Examples was obtained by a mercury intrusion method using a pore distribution measuring device ("Autopore IV9500" manufactured by Micromeritics). The measurement conditions were as follows.
<Measurement Conditions>
  Measuring device: pore distribution measuring device
    (Autopore IV9500 manufactured by Micromeritics)
  Measuring range: 0.0036 to 10.3 μm
  Number of measurement points: 120 points
  Mercury contact angle: 140 degrees
  Mercury surface tension: 480 dyne/cm
  Using the obtained pore distribution, the total pore volume, the pore volume of pores having a diameter of 10 nm or more and less than 100 nm, and the pore volume of pores having a diameter of 100 nm or more and 1000 nm or less were determined. The results are shown in Tables 1 and 2. Tables 1 and 2 also showed the ratio of the pore volume of the pores having a diameter of 100 nm or more and 1000 nm or less to a total pore volume (pore volume ratio).

$$(\text{Pore volume ratio})=[(\text{pore volume of pores having diameter of 100 nm or more and 1000 nm or less})/(\text{total pore volume})]\times 100(\%)$$

The pore distribution of the obtained zirconia-based composite oxide for each of Example 1 and Comparative Example 1 is shown in FIG. 1.

[Measurement of Particle Size $D_{50}$]

0.15 g of the zirconia-based composite oxide (powder) of each of Examples and Comparative Examples and 40 ml of a 0.2% sodium hexametaphosphate aqueous solution were placed in a 50-ml beaker, and dispersed in an ultrasonic homogenizer "Sonifier S-450D" (Emerson Japan, Ltd.) for 5 minutes, followed by placing the dispersed product in a device (laser diffraction type particle size distribution measuring device ("SALD-2300" manufactured by Shimadzu Corporation)) for measurement. The results are shown in Tables 1 and 2.

[Measurement of Tap Bulk Density]

As a device for measuring a tap bulk density, TAP-DENSER KYT-3000 (manufactured by Seishin Enterprise Co., Ltd.) was used. 15 g of a sample powder (zirconia-based composite oxide according to each of Examples and Comparative Examples) was filled in a tapping cell, and the height of a spacer was then set to 3 cm. The tapping cell was set on a tapping table, and tapping was performed 800 times with the measuring device. After the completion of the tapping, the scale of the cell was read, and [(powder weight)/

(volume)] was calculated to obtain the tap bulk density. More detailed measurement conditions were as follows. The results are shown in Tables 1 and 2.

<Measurement Conditions of Tap Bulk Density>

Tapping stroke: 3 cm

Tapping speed: 100 times/50 seconds

[Measurement of Specific Surface Area Before Heat Treatment]

The specific surface area of the zirconia-based composite oxide of each of Examples and Comparative Examples was measured by the BET method using a specific surface area meter ("Macsorb" manufactured by Mountec). The results are shown in Tables 1 and 2.

[Measurement of Specific Surface Area after Heat Treatment at 1000° C. for 3 Hours]

The zirconia-based composite oxide of each of Examples and Comparative Examples was heat-treated at 1000° C. for 3 hours under atmospheric pressure (0.1013 MPa). The specific surface area of the zirconia-based composite oxide after heat treatment at 1000° C. for 3 hours was measured in the same manner as in "Measurement of Specific Surface Area before Heat Treatment". The results are shown in Tables 1 and 2.

[Measurement of Specific Surface Area after Heat Treatment at 1100° C. for 3 Hours]

The zirconia-based composite oxide of each of Examples and Comparative Examples was heat-treated at 1100° C. for 3 hours under atmospheric pressure (0.1013 MPa). The specific surface area of the zirconia-based composite oxide after heat treatment at 1100° C. for 3 hours was measured in the same manner as in "Measurement of Specific Surface Area before Heat Treatment". The results are shown in Tables 1 and 2.

TABLE 1

| | | Example 1 | Example 2 | Example 3 | Example 4 | Example 5 | Example 6 | Example 7 | Example 8 |
|---|---|---|---|---|---|---|---|---|---|
| Composition | $ZrO_2$ (Mass%) | 55 | 55 | 60 | 48 | 80 | 32 | 55 | 55 |
| | $CeO_2$ (Mass %) | 40 | 40 | 25 | 48 | — | 50 | 40 | 40 |
| | $La_2O_3$ (Mass %) | 5 | 5 | 5 | 4 | — | 6 | 5 | 5 |
| | $Y_2O_3$ (Mass %) | — | — | 10 | — | — | 12 | — | — |
| | $Nd_2O_3$ (Mass %) | — | — | — | — | 10 | — | — | — |
| | $Pr_6O_{11}$ (Mass %) | — | — | — | — | 10 | — | — | — |
| Pore Volume | Total Pore Volume (ml/g) | 1.00 | 0.97 | 1.09 | 1.07 | 0.99 | 1.05 | 1.01 | 0.98 |
| | 10-100 nm (ml/g) | 0.42 | 0.47 | 0.52 | 0.56 | 0.51 | 0.48 | 0.45 | 0.40 |
| | 100-1000 nm (ml/g) | 0.09 | 0.05 | 0.08 | 0.09 | 0.08 | 0.07 | 0.09 | 0.06 |
| | Volume Ratio of Pores of 100-1000 nm (%) | 9 | 5 | 7 | 9 | 8 | 7 | 9 | 6 |
| Particle Size $D_{50}$ (μ/m) | | 13 | 16 | 14 | 15 | 14 | 13 | 15 | 13 |
| Tap Bulk Density (g/ml) | | 1.06 | 1.26 | 0.90 | 0.91 | 0.86 | 0.84 | 1.16 | 0.98 |
| Specific Surface Area ($m^2$/g) | Before Heat Treatment | 68 | 68 | 89 | 64 | 81 | 80 | 68 | 70 |
| | After Heat Treatment at 1000° c. for 3 Hours | 57 | 56 | 64 | 55 | 57 | 47 | 60 | 58 |
| | After Heat Treatment at 1100° c. for 3 Hours | 27 | 25 | 28 | 27 | 30 | 27 | 24 | 26 |
| Manufacturing Conditions | Temperature Risen in First Step (° C.) | 120 | 120 | 120 | 120 | 120 | 120 | 150 | 120 |
| | Temperature Risen in Second Step (° C.) | 120 | 120 | 120 | 120 | 120 | 120 | 120 | 150 |
| | Stirring Reynolds Number in First Step | 1000 | 1000 | 1000 | 1500 | 1000 | 500 | 1000 | 1000 |
| | Stirring Reynolds Number in Second Step | 200 | 100 | 200 | 200 | 300 | 200 | 200 | 200 |

TABLE 2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition | $ZrO_2$ (Mass %) | 55 | 60 | 48 | 55 | 55 | 55 | 55 |
| | $CeO_2$ (Mass %) | 40 | 25 | 48 | 40 | 40 | 40 | 40 |
| | $La_2O_3$ (Mass %) | 5 | 5 | 4 | 5 | 5 | 5 | 5 |
| | $Y_2O_3$ (Mass %) | — | 10 | — | — | — | — | — |
| | $Nd_2O_3$ (Mass %) | — | — | — | — | — | — | — |
| | $Pr_6O_{11}$ (Mass %) | — | — | — | — | — | — | — |

TABLE 2-continued

|  |  | Compara-tive Example 1 | Compara-tive Example 2 | Compara-tive Example 3 | Compara-tive Example 4 | Compara-tive Example 5 | Compara-tive Example 6 | Compara-tive Example 7 |
|---|---|---|---|---|---|---|---|---|
| Pore Volume | Total Pore Volume (ml/g) | 1.67 | 1.49 | 1.32 | 1.75 | 0.71 | 1.55 | — |
|  | 10-100 nm (ml/g) | 0.54 | 0.61 | 0.48 | 0.65 | 0.16 | 0.62 | — |
|  | 100-1000 nm (ml/g) | 0.43 | 0.31 | 0.29 | 0.51 | 0.04 | 0.31 | — |
|  | Volume Ratio of Pores of 100-1000 nm (%) | 26 | 21 | 22 | 29 | 6 | 20 | — |
| Particle Size $D_{50}(\mu/m)$ |  | 6 | 7 | 6 | 7 | 3 | 5 | — |
| Tap Bulk Density (g/ml) |  | 0.66 | 0.70 | 0.73 | 0.60 | 1.25 | 0.71 | — |
| Specific | Before Heat Treatment | 57 | 74 | 50 | 62 | 60 | 61 | — |
| Surface Area | After Heat Treatment at 1000° c. for 3 Hours | 48 | 59 | 41 | 50 | 32 | 58 | — |
| (m2/g) | After Heat Treatment at 1100° c. for 3 Hours | 31 | 31 | 27 | 30 | 11 | 24 | — |
| Manufacturing | Temperature Risen in First Step (° C.) | 120 | 120 | 120 | 120 | 80 | 120 | 120 |
| Conditions | Temperature Risen in Second Step (° C.) | —* | —* | —* | 120 | 120 | 80 | —* |
|  | Stirring Reynolds Number in First Step | 1000 | 1000 | 1000 | 1000 | 1000 | 1000 | 200 |
|  | Stirring Reynolds Number in Second Step | —* | —* | —* | 1000 | 200 | 200 | —* |

*No Second Step

The invention claimed is:

1. A zirconia-based composite oxide having a tap bulk density of 0.90 g/ml or more and a specific surface area of 45 m²/g or more after heat treatment at 1000° C. for 3 hours, wherein the zirconia-based composite oxide comprises from 4% to 70% of oxides of one or more selected from rare earth elements other than Pm.

2. The zirconia-based composite oxide according to claim 1, wherein the tap bulk density is 0.90 g/ml or more and 1.3 g/ml or less.

3. The zirconia-based composite oxide according to claim 1, wherein the tap bulk density is 0.90 g/ml or more and 1.27 g/ml or less.

4. The zirconia-based composite oxide according to claim 1, wherein the specific surface area after heat treatment at 1000° C. for 3 hours is 47 m²/g or more and 100 m²/g or less.

5. The zirconia-based composite oxide according to claim 1, wherein the zirconia-based composite oxide has a specific surface area of 15 m²/g or more and 70 m²/g or less after heat treatment at 1100° C. for 3 hours.

6. The zirconia-based composite oxide according to claim 1, wherein the zirconia-based composite oxide has a specific surface area of 45 m²/g or more and 150 m²/g or less.

7. The zirconia-based composite oxide according to claim 1, wherein a ratio of a pore volume of pores having a diameter of 100 nm or more and 1000 nm or less to a total pore volume in a pore distribution based on a mercury intrusion method is 17% or less of the total pore volume.

8. The zirconia-based composite oxide according to claim 1, wherein the zirconia-based composite oxide has a particle size $D_{50}$ of 5 μm or more and 25 μm or less.

9. The zirconia-based composite oxide according to claim 1, wherein a content of zirconia is 30 mass % or more and 95 mass % or less based on 100 mass % of the entire zirconia-based composite oxide.

10. A method for manufacturing a zirconia-based composite oxide according to claim 1, the method comprising:

a first step including a step of adding a sulfating agent to a zirconium salt solution having a temperature of 100° C. or higher while stirring the zirconium salt solution at stirring Reynolds number of 400 or more and 2000 or less, and a step of cooling the zirconium salt solution to which the sulfating agent has been added to 60° C. or lower to obtain a cooled solution; and a second step including a step of heating the cooled solution obtained in the first step to a temperature of 100° C. or higher while stirring the cooled solution at stirring Reynolds number of 10 or more and 350 or less.

11. The method for manufacturing a zirconia-based composite oxide according to claim 10, wherein the stirring Reynolds number in the second step is 50 or more and 300 or less.

12. The method for manufacturing a zirconia-based composite oxide according to claim 10, wherein the stirring Reynolds number in the first step is 600 or more and 1800 or less.

13. The method for manufacturing a zirconia-based composite oxide according to claim 10, wherein the temperature during stirring in the first step is 105° C. or higher and 200° C. or lower.

14. The method for manufacturing a zirconia-based composite oxide according to claim 10, wherein the temperature during stirring in the second step is 105° C. or higher and 180° C. or lower.

* * * * *